(12) United States Patent
Petkov et al.

(10) Patent No.: US 11,265,836 B2
(45) Date of Patent: Mar. 1, 2022

(54) METHOD FOR BIDIRECTIONAL DATA TRANSFER IN NARROWBAND SYSTEMS

(71) Applicant: DIEHL METERING SYSTEMS GMH, Nuremberg (DE)

(72) Inventors: Hristo Petkov, Nuremberg (DE); Raphael Mzyk, Kammerstein (DE); Thomas Kauppert, Nuremberg (DE); Klaus Gottschalk, Winkelhaid (DE)

(73) Assignee: Diehl Metering Systems GmbH, Nuremberg (DE)

( * ) Notice: Subject to any disclaimer, the term of this patent is extended or adjusted under 35 U.S.C. 154(b) by 45 days.

(21) Appl. No.: 16/815,238

(22) Filed: Mar. 11, 2020

(65) Prior Publication Data

US 2020/0213964 A1 Jul. 2, 2020

Related U.S. Application Data

(63) Continuation of application No. PCT/EP2018/000418, filed on Aug. 28, 2018.

(30) Foreign Application Priority Data

Sep. 27, 2017 (DE) ............................ 102017009035
Jan. 4, 2018 (DE) ............................ 102018000044

(51) Int. Cl.
*H04W 56/00* (2009.01)
*H04W 24/02* (2009.01)
(Continued)

(52) U.S. Cl.
CPC ...... *H04W 56/0035* (2013.01); *H01Q 1/2283* (2013.01); *H04L 5/001* (2013.01);
(Continued)

(58) Field of Classification Search
CPC . H04W 56/0035; H04W 24/02; H04W 72/04; H04Q 1/12283; H04L 5/001; H04L 5/06; H04L 27/2657
See application file for complete search history.

(56) References Cited

U.S. PATENT DOCUMENTS 5,239,682 A * 8/1993 Strawcynski ............ H04Q 7/38
6,112,066 A * 8/2000 Hofmann ................ H04B 17/00
(Continued)

FOREIGN PATENT DOCUMENTS

DE 102011082100 A1 3/2013
EP 2369763 A2 9/2011
(Continued)

OTHER PUBLICATIONS

Martin Werner et al., Duplex (Nachrichtentechnik), DIN 44302—Feb. 1987, https://www.elektronik-kompendium.de/sites/kom/0811081.htm.

*Primary Examiner* — Ronald B Abelson
(74) *Attorney, Agent, or Firm* — Laurence A. Greenberg; Werner H. Stemer; Ralph E. Locher (57) ABSTRACT

A method for bidirectional data transmission, preferably in narrowband systems, between a base station and a terminal device includes providing the terminal device and the base station with frequency reference units and transmitting data between the base station and the terminal device over different frequencies. A basic transmit frequency is defined for transmitting data from terminal device to base station, the terminal device defines a terminal device transmit frequency on the terminal device side for transmitting data from terminal device to base station, a frequency offset $\Delta f_{offset}$ exists between the basic transmit frequency and the terminal device transmit frequency, the terminal device opens a receive window for data from the base station, and the frequency offset $\Delta f_{offset}$ is taken into account for opening (Continued)

the window. Base station determines the terminal device transmit frequency and base station transmits data to terminal device based on the determined terminal device transmit frequency.

18 Claims, 5 Drawing Sheets

(51) Int. Cl.
    *H04W 72/04*     (2009.01)
    *H01Q 1/22*     (2006.01)
    *H04L 5/00*     (2006.01)
    *H04L 5/06*     (2006.01)
    *H04L 27/26*     (2006.01)

(52) U.S. Cl.
    CPC ............ *H04L 5/06* (2013.01); *H04L 27/2657* (2013.01); *H04W 24/02* (2013.01); *H04W 72/042* (2013.01)

(56) References Cited

U.S. PATENT DOCUMENTS

| | | |
|---|---|---|
| 6,130,914 A | 10/2000 | Smithers |
| 6,522,306 B1 * | 2/2003 | Parrikar ................. H01Q 13/00 |
| 6,577,615 B1 * | 6/2003 | Ritter ...................... H04B 7/26 |
| 8,045,930 B2 | 10/2011 | Ward |
| 8,301,162 B2 | 10/2012 | Ward |
| 8,824,971 B2 * | 9/2014 | Gormley ................ H04B 17/00 |
| 9,247,539 B2 | 1/2016 | Bernhard et al. |
| 10,028,269 B2 | 7/2018 | Bernhard et al. |
| 10,542,506 B2 | 1/2020 | Liu et al. |
| 10,555,289 B2 | 2/2020 | Zirphile et al. |
| 2002/0055360 A1 * | 5/2002 | Chen ........................ H04Q 7/36 |
| 2005/0070237 A1 * | 3/2005 | Moriai ...................... H04B 1/06 |
| 2008/0298275 A1 * | 12/2008 | De Sousa ................ H04Q 7/24 |
| 2010/0145685 A1 * | 6/2010 | Nilsson .................... G10L 19/14 |
| 2011/0300811 A1 * | 12/2011 | Minemura ............... H04B 1/40 |
| 2016/0360530 A1 | 12/2016 | Leyh et al. |
| 2019/0082412 A1 * | 3/2019 | Zander .................. H04W 56/00 |

FOREIGN PATENT DOCUMENTS

| | | |
|---|---|---|
| WO | 2016139408 A1 | 9/2016 |
| WO | 2017075829 A1 | 5/2017 |
| WO | 2017102036 A1 | 6/2017 |

* cited by examiner

METHOD FOR BIDIRECTIONAL DATA TRANSFER IN NARROWBAND SYSTEMS

CROSS-REFERENCE TO RELATED APPLICATION

This application is a continuation, under 35 U.S.C. § 120, of copending International Application PCT/EP2018/000418, filed Aug. 28, 2018, which designated the United States; this application also claims the priority, under 35 U.S.C. § 119, of German Patent Application 10 2017 009 035, filed Sep. 27, 2017 and German Patent Application 10 2018 000 044, filed Jan. 4, 2018; the prior applications are herewith incorporated by reference in their entirety.

BACKGROUND OF THE INVENTION

Field of the Invention

The present invention relates to a method for bidirectional data transfer in narrowband systems between a base station and at least one terminal device, in which each of the terminal device and the base station have their own frequency reference unit and the data are transmitted between the base station and the terminal device over different frequencies. The present invention further relates to methods in which each of the at least one terminal device and the base station have at least one radio chip and the frequency reference units are connected to the radio chips, or in which the data transmission from the at least one terminal device to the base station takes place at frequencies of an uplink band and the data transmission from the base station to a terminal device takes place at frequencies of a downlink band.

Data transmission from metering units, such as, for example, sensors, consumption meters or components of smart home controllers, is becoming increasingly important in everyday use. Those metering units represent individual terminal devices in a communication system. In a system of that type, small volumes of data are transmitted from a large number of terminal devices to a base station. One important field of application of metering units is the use of intelligent consumption meters, also known as smart meters. Those are normally consumption meters incorporated into a supply network, e.g. for energy, electricity, gas or water, which indicate actual consumption to the respective connection user and use a communication network to transmit the consumption data to the provider. The supplier provides the communication system for transmitting the consumption data by operating base stations in the form of concentrators to collect the consumption data. Intelligent consumption meters offer the advantage that manual meter readings are no longer required and shorter-term billing can be implemented by the provider according to actual consumption. Shorter-term reading intervals in turn enable a more accurate linkage between end customer tariffs and the development of trading prices for electricity. The supply networks can also be substantially more effectively utilized.

Various systems are known for unidirectional and bidirectional data transmission between terminal devices and base stations, such as e.g. DECT (Digital Enhanced Cordless Telecommunications) or RFID (Radio Frequency Identification). In systems of that type, reference frequencies or reference times with which the terminal devices are synchronized are normally specified by the base station. However, frequency and/or time inaccuracies can occur in the terminal devices due to quartz crystal tolerances. Those quartz crystal tolerances are caused, for example, by temperature effects, ageing and/or manufacturing tolerances and result in a frequency offset. Due to the possible tolerances, the channels for the transmission of the terminal devices in the uplink must be chosen to be correspondingly wide so that the individual terminal devices do not interfere with one another. Receive channels chosen to be equally wide are necessary for the receive window of the terminal devices in the downlink.

In order to improve the sensitivity and therefore, for example, the transmission quality of a terminal device, it is possible to use a narrowband system for data transmission. However, due to the quartz crystal tolerances, the receive filter of a terminal device cannot simply be chosen to be very narrow. Due to the frequency offset, the case can occur, for example, where the base station cannot unambiguously identify the channel in which the terminal device has actually transmitted. Thus for example, in a multi-channel system, the frequency-precise return transmission by the base station is difficult, since the frequency of the opened receive window of the terminal device is not known.

DESCRIPTION OF THE RELATED ART

A system for bidirectional data transmission in narrowband systems is known from German Patent Application DE 10 2011 082 100 A1, corresponding to U.S. Pat. Nos. 9,247,539 and 10,028,269. That system enables the terminal devices to transmit with a very narrow frequency spacing without interfering with one another, despite different frequency deviations. The frequencies of the terminal devices can thus lie very close to the band limits, which increases the available uplink bandwidth and may increase the data transmission rate.

European Patent EP 2 369 763 B1, corresponding to U.S. Pat. Nos. 8,301,162 and 8,045,930, discloses a communication system formed of transceiver units of a first and a second type, wherein transceiver units of the first type include frequency comparison units in order to compare the frequencies received from the transceiver units of the second type with a reference frequency and to form an offset signal, wherein the reference frequency is set according to the offset signal.

BRIEF SUMMARY OF THE INVENTION

It is accordingly an object of the invention to provide a novel method for bidirectional data transfer in narrowband systems, which overcomes the hereinafore-mentioned disadvantages of the heretofore-known methods of this general type and in which an improved transmission quality is enabled simultaneously with a more efficient utilization of the bandwidth.

With the foregoing and other objects in view there is provided, in accordance with the invention, a method for bidirectional data transmission, preferably taking place in a narrowband system, between a base station and a terminal device, preferably a plurality of terminal devices, wherein the terminal device and the base station each have their own frequency reference unit and the data are transmitted between the base station and the terminal device over different frequencies, the method having the following method steps:

a basic transmit frequency is defined by the terminal device for transmitting data to the base station;

the terminal device defines a terminal device transmit frequency on the terminal device side for transmitting data from the terminal device to the base station, wherein a frequency offset $\Delta f_{offset}$ exists between the basic transmit frequency and the terminal device transmit frequency;

the terminal device opens a receive window to receive data originating from the base station, wherein the frequency offset $\Delta f_{offset}$ is taken into account for the opening of the receive window;

the base station determines the terminal device transmit frequency; and the base station transmits data to the terminal device on the basis of the determined terminal device transmit frequency.

The entire data transmission, particularly in a narrowband system, is thus based on a basic transmit frequency from which the terminal device transmit frequencies are derived. The terminal device can freely define its terminal device transmit frequency. The transmit frequency of the terminal device is thus independent of specified channels or channel spacings. The terminal device transmit frequency can preferably be the same as the basic transmit frequency and can thus have a frequency offset $\Delta f_{offset}$ of 0 Hz. On the basis of the data transmitted by the terminal device, the base station determines the terminal device transmit frequency. The frequency for the return transmission is similarly derived from the terminal device transmit frequency. With the objects of the invention in view, there is also provided a method for bidirectional data transmission, preferably taking place in a narrowband system, between a base station and a terminal device, preferably a plurality of terminal devices, wherein the terminal device and the base station each have their own frequency reference unit and the data are transmitted between the base station and the terminal device over different frequencies, in particular as recited above, having the following method steps:

the terminal device opens a receive window to receive data originating from the base station, the window having a frequency offset $\Delta f_{up/down}$ in relation to the terminal device transmit frequency;

the terminal device takes into account $\Delta f_{up/down}$ for the opening of the receive window;

the base station determines the terminal device transmit frequency of the data transmitted by the terminal device; and the base station transmits data to the terminal device on the basis of the determined terminal device transmit frequency of the terminal device and incorporating $\Delta f_{up/down}$.

The terminal device transmits on a terminal device transmit frequency. When the receive window is opened for the terminal device transmit frequency, the terminal device correspondingly takes account of $\Delta_{up/down}$. The base station receives data on the terminal device transmit frequency and determines the terminal device transmit frequency. In the transmission of data from the base station back to the terminal device, the base station incorporates the determined terminal device transmit frequency of the terminal device and $\Delta f_{up/down}$. The frequency offset $\Delta f_{up/down}$ in relation to the terminal device transmit frequency is added for this purpose. The terminal device opens its receive window at a frequency which has a frequency offset $\Delta f_{up/down}$ in relation to the first terminal device transmit frequency. On the basis of the basic transmit frequency, the frequency difference $\Delta f_{offset}$ in relation to the terminal device transmit frequency, for example, can additionally be defined by the terminal device.

A further development of the invention enables the provision of additional method steps, wherein:

the terminal device defines a further terminal device transmit frequency on the terminal device side in order to transmit data from the terminal device to the base station, wherein a further frequency offset $\Delta f_{offset}$ exists between the basic transmit frequency and the further terminal device transmit frequency;

the terminal device takes into account $\Delta f_{offset}$ for the opening of the receive window of the further terminal device transmit frequency; and the base station determines the terminal device transmit frequency of the data transmitted by the terminal device at the further terminal device transmit frequency.

The bidirectional transmission between the base station and the terminal device can be performed in the same way at further terminal device transmit frequencies. The frequency difference $\Delta f_{offset}$ in relation to a further terminal device transmit frequency can also be defined in this case by the terminal device on the basis of the basic transmit frequency. The terminal device can take into account $\Delta f_{offset}$ and, if necessary, additionally $\Delta f_{up/down}$ and/or $\Delta f_{offset}$ when the receive window is opened. The base station similarly takes into account the determined terminal device transmit frequency of the terminal device and, if necessary, additionally $\Delta f_{up/down}$ when data are transmitted back to the terminal device.

Advantageously, the problem of channel allocation can thus be eliminated, since the return transmit channel of the base station is determined on the basis of the terminal device transmit frequency. The invention thus enables terminal devices to transmit in a narrowband system without having to follow a specified channel allocation. The terminal device transmit frequency can therefore also be at frequencies outside the channels.

With the objects of the invention in view, there is furthermore provided a method for bidirectional data transmission, preferably taking place in a narrowband system, between a base station and a terminal device, preferably a plurality of terminal devices, wherein the terminal device and the base station each have their own frequency reference unit and the terminal device and the base station each have at least one radio chip, wherein the frequency reference units are connected to the radio chips and the data are transmitted between the base station and the terminal device over different frequencies, in particular as recited above, having the following method steps:

frequency-influencing effects of the radio chips are measured, wherein a frequency offset $\Delta f_{chip}$ is thereby determined, and the terminal device opens a receive window to receive data originating from the base station, wherein the frequency offset $\Delta f_{chip}$ is taken into account for the opening of the receive window.

The base station and the terminal device each have their own frequency reference units. These frequency reference units may be implemented, for example, on a printed circuit board in the form of a crystal oscillator. The base station and the terminal device further include their own radio chips. These radio chips can normally be integrated circuits (IC) which are different from the frequency reference units. The frequency reference units are connected to the radio chips in order to guarantee communication.

A frequency-influencing effect can emanate, for example, from the architecture of the radio chip. In order to determine the frequency offset $\Delta f_{chip}$, the architecture, for example, of the chips that are used can be measured. This value can then be appropriately stored accordingly in the base station or in the terminal device. Following an uplink data transfer from the terminal device to the base station, the terminal device can advantageously take into account the frequency offset $\Delta f_{chip}$ when opening the receive window. It is similarly possible for the base station to take into account the frequency offset $\Delta f_{chip}$ during the data transmission to the terminal device. The radio chips that are used can advantageously be measured once only, since the frequency-influencing effect is normally identical for all batches of the respective radio chip.

The basic transmit frequency may be appropriately fixed and may have been defined in advance. The basic transmit frequency is defined by the terminal device during the data transmission between the terminal device and the base station, but the basic transmit frequency may already have been defined in the terminal device, for example during the manufacture or installation of the terminal device.

It is furthermore possible for the first terminal device transmit frequency to deviate from the basic transmit frequency by a frequency tolerance $\Delta f_T$. The frequency tolerance $\Delta f_T$ can occur, for example, due to temperature influences.

The frequency tolerance $\Delta f_T$ can furthermore be caused by an offset between the frequency reference units of the base station and the terminal device. The frequency reference units may, for example, be quartz crystals. Frequency inaccuracies and/or time inaccuracies, for example, can occur due to these quartz crystals. The terminal devices are normally more severely affected by these inaccuracies than the base station. The base station can normally have a fixed energy supply and possibly additional synchronization facilities. This frequency tolerance $\Delta f_T$ is caused, for example, by temperature influences, ageing and/or manufacturing tolerances of the quartz crystal and results in a frequency offset between the base station and the terminal device.

The basic transmit frequency can be appropriately known to the base station. On the basis of the determined terminal device transmit frequency, the base station can thus determine, for example, the frequency tolerance $\Delta f_T$ in relation to the basic transmit frequency of the terminal device. It is thus possible, for example, for the frequency tolerance $\Delta f_T$ to be taken into account in a simple manner during the transmission or reception of data to or from the terminal device.

It is particularly appropriate if the frequency offset $\Delta f_{up/down}$ is a fixed value defined in advance. It can thus be ensured that the base station and every terminal device use the same frequency offset $\Delta f_{up/down}$ and therefore use the same frequency accordingly for transmission or reception. The frequency offset $\Delta f_{up/down}$ can advantageously be fixed, i.e. not modifiable or not easily modifiable, in order to prevent the possible occurrence, for example, of a discrepancy in the frequency offset $\Delta f_{up/down}$ between the base station and the terminal device during operation.

It is therefore particularly appropriate for the frequency offset $\Delta f_{up/down}$ to be known to the base station and to the terminal device.

The terminal device can advantageously define the terminal device transmit frequency in such a way that interference-affected frequencies and/or interference-affected frequency ranges are avoided. In order to do this, the terminal device can, for example, carry out a hidden node detection in order to identify e.g. interferers. The terminal device can define the terminal device transmit frequency on this basis. The terminal device can, for example, actively set the frequency offset $\Delta f_{offset}$ in order to define the terminal device transmit frequency. The terminal device can thus respond independently to interfering influences from its environment and can improve transmission quality.

It is similarly advantageous for the terminal device to measure its own transmit power and define the terminal device transmit frequency on this basis. Causes of fluctuations in the transmit power may, for example, be fading effects due to interference, shadowing, multipath propagation or the Doppler effect. The Received Signal Strength Indicator (RSSI), for example, can be used as an indicator. The RSSI value of the last packet in the downlink, for example, can thus be measured. If the signal strength for a successful communication on the current frequency is not attained, it is possible to switch to a better frequency. Transmission quality can thus be improved through the corresponding adjustment of the terminal device transmit frequency.

The base station can advantageously transmit the data to the respective terminal device incorporating the frequency tolerance $\Delta f_T$ of the terminal device. The base station may, for example, estimate or know the physically maximum possible frequency tolerance $\Delta f_T$ of the terminal device, or may have determined it e.g. on the basis of the basic transmit frequency. The frequency tolerance $\Delta f_T$ of the terminal device can therefore also be taken into account during the transmission of data to the terminal device. The base station can, for example, furthermore transmit the determined frequency tolerance $\Delta f_T$ of the terminal device to the terminal device. The terminal device can thereby take into account e.g. its crystal offset in relation to the base station.

It is furthermore possible for the terminal device to take into account its frequency tolerance $\Delta f_T$ for the opening of the receive window. For this purpose, the terminal device may, for example, know or estimate its physically maximum possible frequency tolerance $\Delta f_T$. It is furthermore possible that the base station has determined the frequency tolerance $\Delta f_T$ of the terminal device and has transmitted it to the terminal device. The receive window of the terminal device can therefore be opened more precisely at the exact frequency.

With the objects of the invention in view, there is additionally provided a method for bidirectional data transmission, preferably taking place in a narrowband system, between a base station and a terminal device, preferably a plurality of terminal devices, wherein the terminal device and the base station each have their own frequency reference unit and the data are transmitted between the base station and the terminal device over different frequencies, wherein the data transmission from the terminal device to the base station takes place at frequencies of an uplink band, and the data transmission from the base station to a terminal device takes place at frequencies of a downlink band, in particular according to a preceding configuration of the invention and having the following method steps:

the base station transmits data to the terminal device on the basis of the determined terminal device transmit frequency and taking into account the width of the downlink band; and the terminal device takes into account the width of the downlink band for the opening of the receive window.

The signal transmission from a terminal device to the base station is referred to as the uplink and the signal transmission from the base station to a terminal device is referred to as the downlink. Possible transmit frequencies for the uplink or downlink lie accordingly in the uplink band or downlink band. The basic transmit frequency and the terminal device transmit frequencies are appropriately in the uplink band.

The base station transmits back to the terminal device in the downlink band, wherein the downlink band can be appropriately shifted in relation to the uplink band by the frequency offset $\Delta f_{up/down}$.

It is also possible for the uplink band to be wider than the downlink band. The case may occur in this case where the terminal device transmit frequency lies within the uplink band but the corresponding frequency shifted by the frequency offset $\Delta f_{up/down}$, on which the base station transmits back, lies outside the downlink band. In order to then be able to fully utilize the uplink band, the transmit frequency of the base station, insofar as it is located outside the downlink band, is adjusted in such a way that it is again located in the downlink band. The transmit frequency of the base station can be supplemented, for example, by a frequency offset $\Delta f_{wrap}$. The frequency offset $\Delta f_{wrap}$ is chosen in such a way that the resulting transmit frequency of the base station is located within the downlink band. A possibility is thus created for efficiently utilizing the available band (uplink band or downlink band) in narrowband systems, with simultaneously improved transmission quality. In addition, the terminal device can check whether the transmit frequency of the base station might be located outside the downlink band, taking account of $\Delta f_{up/down}$ and/or $\Delta f_{offset}$ and/or $\Delta f_{offset}$. The terminal device opens its receive window accordingly at a frequency within the downlink band. For this purpose, the terminal device can appropriately take into account the frequency offset $\Delta f_{wrap}$. It may therefore be particularly appropriate for the frequency offset $\Delta f_{wrap}$ to have been defined in advance and/or for the base station and the terminal device to know frequency offset $\Delta f_{wrap}$.

A maximum possible frequency tolerance $\Delta f_{T,max}$ can preferably be stored in the terminal device and in the base station. The maximum frequency tolerance $\Delta f_{T,max}$ can be appropriately determined by incorporating the quartz crystal error of the terminal device and the quartz crystal error of the base station. The terminal device and the base station can also incorporate the frequency tolerance $\Delta f_{T,max}$ when checking whether the transmit frequency of the base station lies outside the frequency range. Insofar as the transmit frequency of the base station, taking into account the maximum frequency tolerance $\Delta f_{T,max}$, lies outside the downlink band, the frequency offset $\Delta f_{wrap}$, for example, can additionally be taken into account during the opening of the receive window or during the transmission.

The base station and the terminal device can appropriately know the position of the uplink band and the position of the downlink band. If the terminal device and the base station know the position of the uplink band and the downlink band, it is ensured that the terminal device and the base station take into account the width of the downlink band in the same way during the opening of the receive window or during the transmission of data.

The occupied frequency bandwidth is defined in the ETSI EN 300 220-1 V3.1.1 standard as the frequency range within which 99% of the total average power of a transmission lies. The channels of the bidirectional data transmission, preferably taking place in a narrowband system, can have a channel bandwidth ranging from 1 kHz to 25 kHz, preferably from 2 kHz to 6 kHz, preferably from 3 kHz to 5 kHz. An efficient utilization of the available bandwidth can thus be ensured, so that the channel capacity and therefore the number of possible terminal devices per base station are increased.

The channels of the bidirectional data transmission, preferably taking place in a narrowband system, can appropriately have a symbol rate ranging from 0.5 kbaud to 20 kbaud, preferably from 0.5 kbaud to 6 kbaud.

It is possible for the frequency tolerance $\Delta f_T$ of the terminal device to be greater than the bandwidth of the channels. The frequency tolerance $\Delta f_T$ is temperature-dependent. In a narrowband system, the channels have a narrow bandwidth which may be considerably below the quartz crystal tolerances of the transmitter and the receiver. In order to avoid being reliant on a wide filter which adversely affects the sensitivity of the signal and increases noise, the terminal device transmit frequency is determined in a bidirectional system in the uplink and is taken into account in the downlink in the setting of the base station transmit frequency. Transmission quality can thus be improved through the derivation of the terminal device transmit frequency and the base station transmit frequency from a basic transmit frequency.

The frequency tolerance $\Delta f_T$ of the terminal device may lie within the range from 1 ppm to 100 ppm, preferably from 3 ppm to 50 ppm, preferably from 5 ppm to 30 ppm.

The base station can appropriately adjust the receive frequency at least three times and/or can open the receive window with a triple frequency bandwidth. It can thus be ensured that the transmitted data are received at the base station. Insofar as the receive window is opened with a triple frequency bandwidth, the transmit frequency can be determined, for example, by using a Fast Fourier Transform (FFT).

The synchronization sequence between the base station and the terminal device can advantageously be extended, preferably tripled. The synchronization of the terminal devices with the base station can thereby be simplified, as a result of which the data reception by the base station can be ensured.

The ratio of the bandwidth of a channel to the frequency tolerance $\Delta f_T$ of the terminal device can advantageously be less than three. A channel bandwidth of e.g. 25 kHz and a frequency tolerance of $\Delta f_T$ of the quartz crystal of e.g. 30 ppm in an ISM band with a carrier frequency of 868 MHz produce a ratio of 25 kHz to 26.04 kHz. This gives a rounded ratio, by way of example, of 0.96.

Other features which are considered as characteristic for the invention are set forth in the appended claims.

Although the invention is illustrated and described herein as embodied in a method for bidirectional data transfer in narrowband systems, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
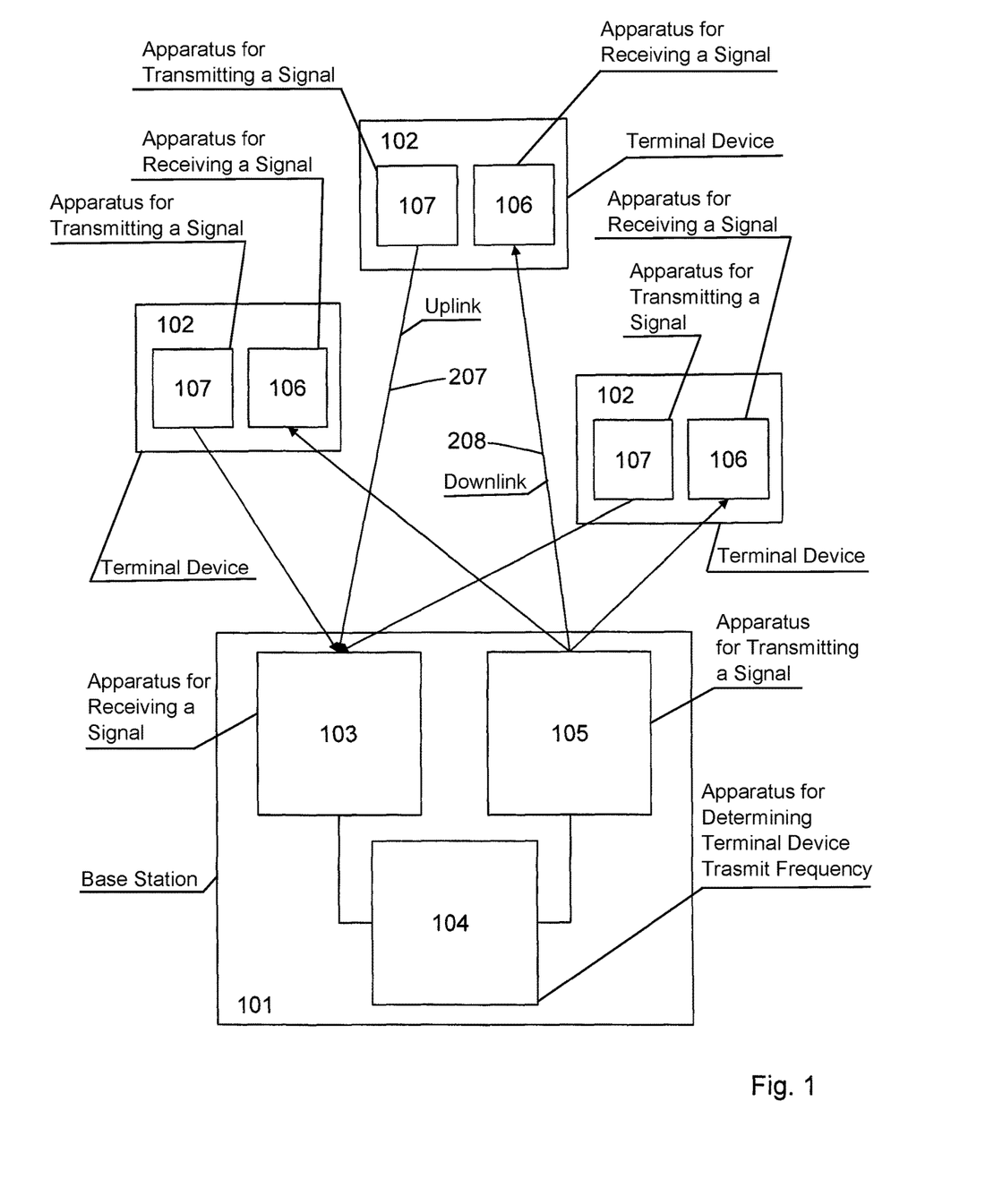
FIG. 1 is a highly simplified block diagram of the apparatuses of the base station and the apparatuses of the terminal devices.

Referring now to the figures of the drawings in detail and first, particularly, to FIG. 1 thereof, it is seen that reference number 101 denotes a base station with an apparatus 103 for receiving a signal transmitted by a terminal device 102 in an uplink 207 at a terminal device transmit frequency 202 which has a frequency offset $\Delta f_{offset}$ in relation to a basic transmit frequency 201. The base station 101 further has an apparatus 104 for determining the terminal device transmit frequency 202. An apparatus 105 for transmitting a signal to a terminal device 102 in a downlink 208 similarly forms part of the base station 101. The signals to a terminal device 102 are transmitted at a base station transmit frequency 203 in the downlink 208. In this case, the base station transmit frequency is the determined terminal device transmit frequency 202 which has been supplemented by the frequency offset $\Delta f_{up/down}$. The three apparatuses 103, 104 and 105 of the base station 101 are internally connected.

The three terminal devices 102 shown in each case include an apparatus 107 for transmitting a signal at the terminal device transmit frequency 202 and an apparatus 106 for receiving a signal transmitted by the base station 101 at the base station transmit frequency 203. The signals in the uplink 207, shown by the three arrows pointing from the apparatus 107 of a terminal device 102 for transmission to the apparatus 103 of the base station 101 for reception, are transmitted at the corresponding terminal device transmit frequency 202. The signals in the downlink 208 from the apparatus 105 of the base station 101 for transmission to the apparatuses 106 of the terminal devices 102 for reception are transmitted at the base station transmit frequency 203. The terminal device transmit frequency 202 and the corresponding base station transmit frequency 203 may differ for each individual terminal device 102. Particularly in the case of a plurality of terminal devices 102, it is particularly advantageous if the terminal device transmit frequencies 202 of the individual terminal devices 102 differ from one another so that they do not interfere with one another during the transmission. The corresponding base station transmit frequencies 203 similarly differ from one another. The different terminal device transmit frequencies 202 are preferably located in an uplink band 209 and the corresponding base station transmit frequencies 203 in a downlink band 210.

Figure 2A:
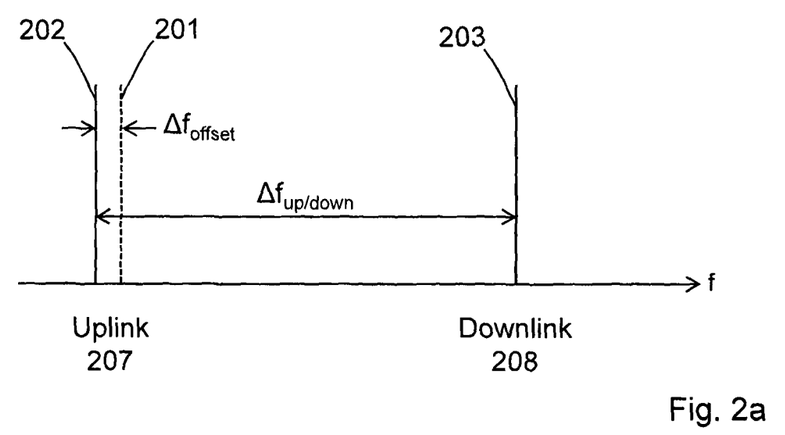
FIGS. 2A-2B are highly simplified diagrams of the uplink and the downlink between the base station and the terminal device with the frequency offsets $\Delta f_{up/down}$ and $\Delta f_{offset}$.
Figure 2B:
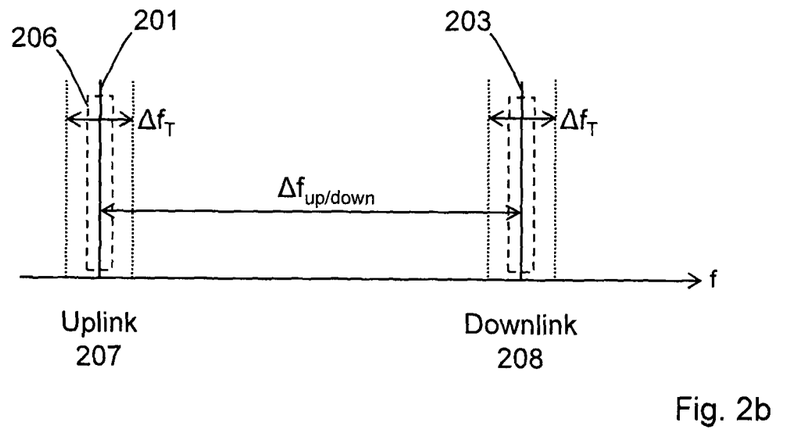

FIGS. 2A and 2B show the uplink 207 and the downlink 208 between the base station 101 and the terminal device 102 with different frequency offsets $\Delta f_{up/down}$, $\Delta f_{offset}$ and $\Delta f_T$.

FIG. 2A shows the basic transmit frequency 201 and the terminal device transmit frequency 202 in the uplink 207. The terminal device transmit frequency 202 has a frequency offset $\Delta f_{offset}$. The frequency offset $\Delta f_{offset}$ can be defined by the terminal device 102 by changing the terminal device transmit frequency 202. One reason for changing the terminal device transmit frequency 202 may, for example, be a different interferer which the terminal device 102 has iden-tified, for example by using a hidden node detection. A change in the terminal device transmit frequency 202 may furthermore occur, for example, alternatively or additionally on the basis of the measurement of the actual transmit power of the terminal device 102. The base station transmit frequency 203 is shown in the downlink 208. On the basis of the terminal device transmit frequency 201, the base station transmit frequency 203 is shifted by the frequency offset $\Delta f_{up/down}$.

In an alternative configuration or development of the invention, the terminal device 102 takes into account the system tolerances or the stored maximum possible frequency tolerance $\Delta f_{T,max}$. In FIG. 2B, the first frequency offset 211 is shown as the range of the frequency tolerance $\Delta f_T$ around the basic transmit frequency 201. The frequency tolerance $\Delta f_T$ is also taken into account in the uplink 207 and in the base station transmit frequency 203 in the downlink 208. The maximum frequency tolerance $\Delta f_T$ can appropriately be known to the terminal device 102 and to the base station 101. The frequency tolerance $\Delta f_T$ is furthermore greater in this case than the bandwidth 206 of a channel in the narrowband system.

Figure 3:
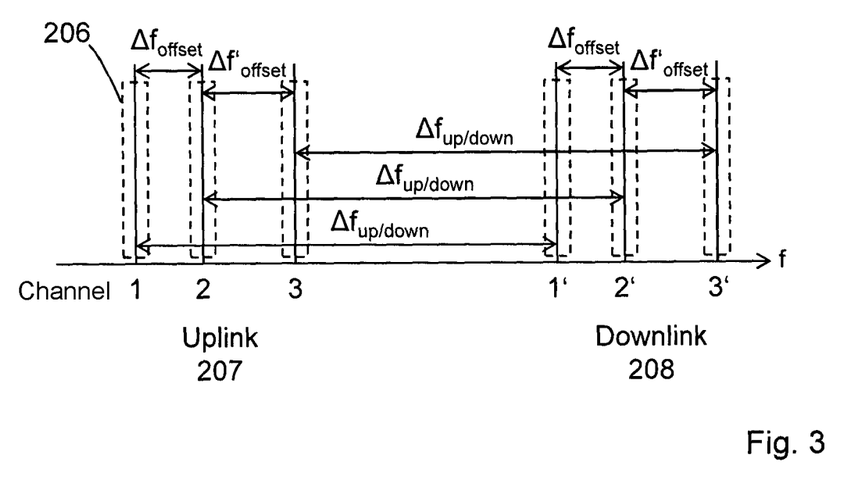
FIG. 3 is a highly simplified diagram of the uplink and the downlink between the base station and the terminal device for three channels.

FIG. 3 shows the uplink 207 and the downlink 208 between the base station 101 and the terminal device 102 by way of example for three channels 1, 2, 3 and 1', 2', 3'. The terminal device 102 transmits by default in the uplink 207 in only one channel 1, at the basic transmit frequency 201. If the terminal device 102 wishes to transmit on a different channel, e.g. on channel 2, the terminal device 102 assumes the basic transmit frequency 201 which is supplemented with a corresponding frequency offset $\Delta f_{offset}$. For channel 1, the frequency offset $\Delta f_{offset}$ corresponds in this example to 0 Hz. In this case, the terminal device transmit frequency 202 is therefore equal to the basic transmit frequency 201. For channel 2, the frequency offset $\Delta f_{offset}$ is unequal to 0 Hz and the terminal device transmit frequency 202 is therefore unequal to the basic transmit frequency 201. For a further channel, in this case, for example channel 3, the frequency offset is $\Delta f'_{offset}$. The frequency offset $\Delta f'_{offset}$ may be unequal to the frequency offset $\Delta f_{offset}$. The base station 101 receives the signal from the terminal device 102 and determines the terminal device transmit frequency 202. The channel in which the terminal device has transmitted or had intended to transmit is thus irrelevant to the base station 101. In the downlink 208, the base station 101 transmits a signal back to the terminal device 102 at a base station transmit frequency 203 which has the frequency offset $\Delta f_{up/down}$ in relation to the determined terminal device transmit frequency 201. The frequency offset $\Delta f_{up/down}$ may describe, for example, the frequency offset from the uplink band 209 to the downlink band 210. The frequency offset $\Delta f_{up/down}$ has, for example, been defined in advance and is known to the base station 101 and to the terminal device 102. The terminal device 102 in turn opens its receive window at a frequency which it receives through the supplementing of its basic transmit frequency 201 with the frequency offsets $\Delta f_{offset}$ or $\Delta f'_{offset}$ and $\Delta f_{up/down}$.

In one specific example, the terminal device 102 transmits in the uplink 208 in channel 1 at a frequency of 868.17 MHz. Assuming that no frequency offset occurs due to external influences such as temperature, i.e. no frequency tolerance $\Delta f_T$ is to be taken into account, the terminal device 102 transmits at a real frequency of 868.17 MHz. In this example, the basic transmit frequency 201 is 868.17 MHz, and for this reason the frequency offset $\Delta f_{offset}$ in this case is 0 Hz. The base station 101 receives the signal and determines the terminal device transmit frequency 202 as 868.17

MHz. On the basis of the terminal device transmit frequency, the base station 101 adds the frequency offset $\Delta f_{up/down}$ which, in this example, is 1.4 MHz. The base station 101 thus transmits back to the terminal device 102 at a base station transmit frequency 203 of 869.57 MHz in the downlink 208, corresponding, for example, to the return channel 1'. This terminal device 102 has similarly added the frequency offset $\Delta f_{up/down}$ to its terminal device transmit frequency 202 and has correspondingly opened a receive window at 869.57 MHz. The terminal device 102 can thus receive the signal of the base station 101 in the downlink 208.

In a further example, this terminal device 102 intends to transmit in channel 2, for example at a frequency of 868.21 MHz. Under the same assumption that no frequency offset occurs due to external influences, the terminal device 102 transmits at a real frequency of 868.21 MHz. Since the basic transmit frequency 201 in this example is 868.17 MHz, the frequency offset $\Delta f_{offset}$ is therefore 40 kHz. The terminal device 102 adds the frequency offset $\Delta f_{up/down}$ of 1.4 MHz to the terminal device transmit frequency 202 of 868.21 MHz which is derived from the sum of the basic transmit frequency 201 of 868.17 MHz and the frequency offset $\Delta f_{offset}$ of 40 kHz, and opens a receive window at 869.61 MHz, denoted in this case as the return channel 2'. The base station 101 receives the signal from the terminal device 102 and determines the terminal device transmit frequency 202 as 868.21 MHz. The base station 101 correspondingly transmits at a base station transmit frequency 203 of 869.61 MHz. The terminal device 102 can thus receive the signal of the base station 101 in the return channel 2' in the downlink 208.

In this example, the channels have a spacing of 40 kHz from one another. The bandwidth 206 of the channels can appropriately lie within the range from 1 kHz to 20 kHz, preferably from 2 kHz to 6 kHz, preferably from 3 kHz to 5 kHz.

Figure 4:
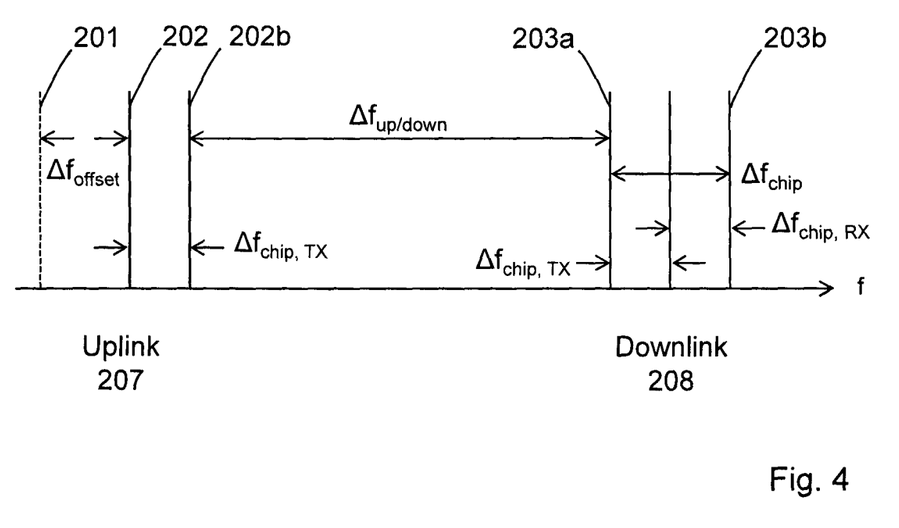
FIG. 4 is a highly simplified diagram of the uplink and the downlink between the base station and the terminal device with the frequency offset $\Delta f_{chip}$.

FIG. 4 shows the basic transmit frequency 201 and the terminal device transmit frequency 202 in the uplink 207. The terminal device transmit frequency 202 has a frequency offset $\Delta f_{offset}$ in relation to the basic transmit frequency 201. A frequency offset $\Delta f_{chip}$ furthermore occurs due to frequency-influencing effects of the radio chip. The frequency offset $\Delta f_{chip}$ can be taken into account in the base station or in the terminal device, so that $\Delta f_{chip}$ is taken into account unilaterally. In the present example, $\Delta f_{chip,\ RX}$ is taken into account in the terminal device. In this case, $\Delta f_{chip,\ TX}$ denotes the frequency error due to the radio chip of the terminal device during transmission and $\Delta f_{chip,\ RX}$ denotes the frequency error due to the radio chip of the terminal device during reception. The terminal device therefore transmits at a terminal device transmit frequency 202b without compensation of $\Delta f_{chip,\ TX}$. The base station transmit frequency 203 is shown in the downlink 208. On the basis of the terminal device transmit frequency 202b without compensation of $\Delta f_{chip,\ TX}$, the base station transmit frequency 203 is shifted by the frequency offset $\Delta f_{up/down}$. A base station transmit frequency 203 of 868 MHz, for example, is intended to be set in the terminal device. However, the determined frequency offset $\Delta f_{chip}$ is, for example, 0.000300 MHz, so that the terminal device would open its receive window at a base station transmit frequency 203b of 868.000300 MHz without compensation of $\Delta f_{chip}$. If the terminal device, when opening its receive window, takes into account the frequency offset $\Delta f_{chip}$ for the opening of the receive window, the terminal device will open its receive window at the base station transmit frequency 203a of 868.000000 MHz with compensation of $\Delta f_{chip}$. It is possible to take into account the frequency offset $\Delta f_{chip}$ alone or in combination with the frequency offset $\Delta f_{offset}$ and/or the frequency offset $\Delta f_{up/down}$.

Figure 5A:
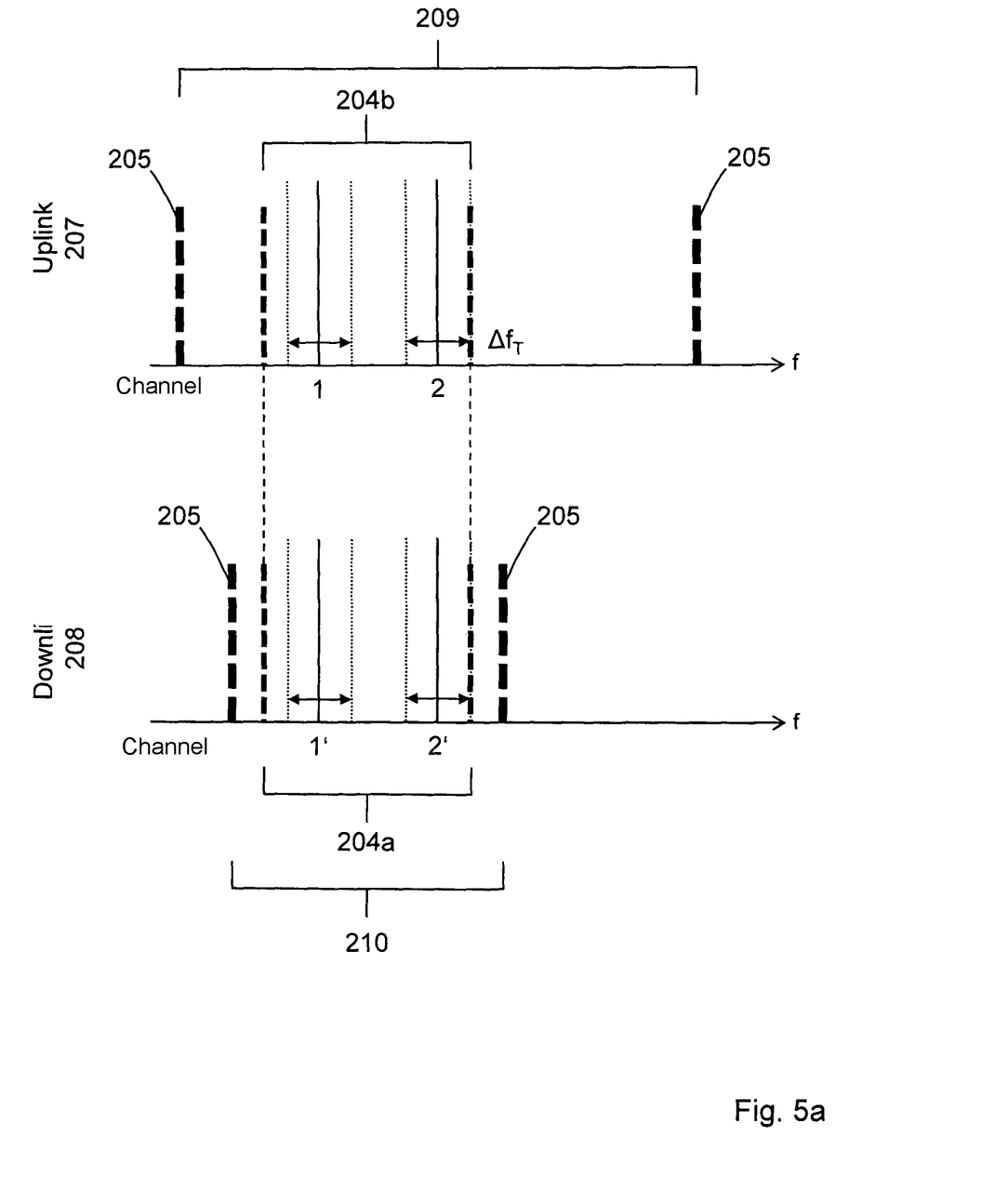
FIGS. 5A-5B are highly simplified diagrams of the uplink and the downlink with the band limits and the frequency range.
Figure 5B:
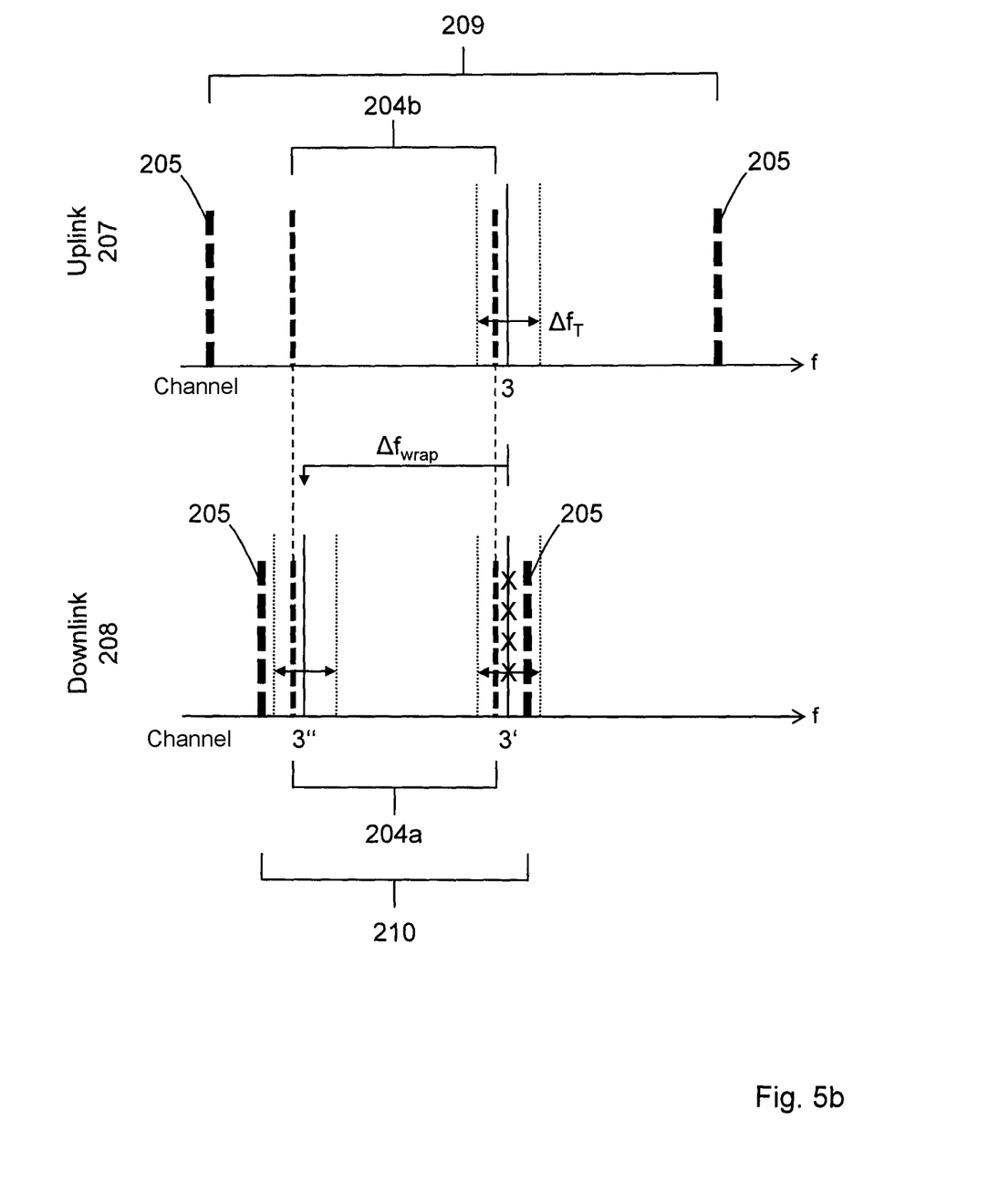

FIGS. 5A and 5B show the uplink 207 and the downlink 208 with an indication of the band limits 205 and a frequency range 204. The uplink band 209 is, for example, wider in this case than the downlink band 210. A frequency tolerance $\Delta f_T$ which occurs, for example due to external influences such as temperature, is assumed for each channel. The narrower downlink band 210 thus produces a frequency range 204a, the limits of which have a distance from the band limits 205 of the downlink band 210 amounting to half of the frequency tolerance $\Delta f_{T,max}/2$. The frequency range 204b in the uplink band 209 is shifted from the frequency range 204a of the downlink band 210 by the frequency offset $\Delta f_{up/down}$.

FIG. 5A shows two channels (channel 1, 2) in the uplink 207 and their corresponding return channels (channel 1', 2') in the downlink 208. Both channels are indicated with corresponding frequency tolerances $\Delta f_T$. If the frequencies of the channels in the uplink 207 lie within the frequency range 204b, the corresponding frequencies of the return channels (channel 1', 2') shifted by the frequency offset $\Delta f_{up/down}$ can be used within the frequency range 204a. The base station 101 and the terminal device 102 know the position of the band limits 205 in the uplink 207 and the downlink 208. In addition, the possible frequency tolerance $\Delta f_T$ may be known or may have been estimated as the maximum possible frequency tolerance $\Delta f_{T,max}$. The position of the frequency range 204a or 204b in the downlink 208 or uplink 207 is thus also known to the base station 101 and to the terminal device 102. The frequency range 204a or 204b lies within the band limits 205 of the downlink band 210 or the uplink band 209.

In one specific example, the downlink band 210 has a width of 250 kHz with the band limits at 869.4 MHz and 869.65 MHz which the base station 101 and the terminal device 102 know. The uplink band 209 has its band limits, for example, at 868.0 MHz and 868.6 MHz and, with a width of 600 kHz, is wider than the downlink band 210. The possible frequency tolerance $\Delta f_T$ is furthermore known or has been estimated as a maximum value of ±30 kHz. The limits of the frequency range 204a in the downlink band 210 are therefore at 869.43 MHz and 869.62 MHz. The frequency offset $\Delta f_{up/down}$ is 1.4 MHz. The terminal device 102 transmits, for example, on channel 1 at a terminal device transmit frequency 202 of 868.19 MHz. This corresponds to a base station transmit frequency 203 of 869.59 MHz shifted by the frequency offset $\Delta f_{up/down}$ and therefore lying within the frequency range 204a. The terminal device 102 recognizes this and sees no need to supplement the base station transmit frequency 203 with an additional frequency offset, for example the frequency offset $\Delta f_{wrap}$. The terminal device 102 consequently opens its receive window at the base station transmit frequency 203 of 869.59 MHz. The base station 101 recognizes in the same way that the base station transmit frequency 203 does not have to be supplemented by an additional frequency offset in order to lie within the frequency range 204a. The base station 101 transmits back to the terminal device 102 at the base station transmit frequency 203 of 869.59 MHz (channel 1').

Channel 3 in FIG. 5B lies outside the frequency range 204b of the uplink band 209. The corresponding return channel (channel 3') having the base station transmit frequency 203, incorporating the frequency tolerance $\Delta f_T$, may thus lie outside the downlink band 210. In order to avoid this, the base station transmit frequency 203 is supplemented with a frequency offset $\Delta f_{wrap}$ in such a way that the resulting base station transmit frequency 203 (channel 3") lies within the frequency range 204a and therefore, taking into account the frequency tolerance $\Delta f_T$, within the downlink band 210. The frequency offset $\Delta f_{wrap}$ can appropriately correspond to the width of the frequency range 204. If a frequency offset $\Delta f_{wrap}$ is required, the base station 101 transmits at a base station transmit frequency 203 which has been supplemented on the basis of the determined terminal device transmit frequency 202 with the frequency offset $\Delta f_{up/down}$ and the additional frequency offset $\Delta f_{wrap}$. The terminal device 102 similarly opens its receive window at a base station transmit frequency 203 with an additional frequency offset $\Delta f_{wrap}$.

The terminal device 102 transmits, for example, on channel 3 at a terminal device transmit frequency 202 of 868.24 MHz. The corresponding base station transmit frequency 203 of 869.64 MHz (return channel 3') shifted by the frequency offset $\Delta f_{up/down}$ would therefore still lie below the upper band limit 205 of the downlink band 210 of 869.65 MHz. However, the real terminal device transmit frequency 202 and the corresponding base station transmit frequency 203 could be up to 30 kHz higher due to the frequency tolerance $\Delta f_T$. The real base station transmit frequency 203 with a value of up to 869.67 MHz could therefore lie outside the downlink band 210. Every base station transmit frequency 203 greater than or greater than or equal to 869.62 MHz is correspondingly supplemented with an additional frequency offset $\Delta f_{wrap}$. The frequency offset $\Delta f_{wrap}$ corresponds in this case, for example, to the width of the frequency range 204. The frequency range 204 has, for example, a width of 190 kHz, corresponding to the width of the downlink band 210 von 250 kHz minus the frequency tolerance $\Delta f_T$ of 60 kHz. The resulting base station transmit frequency 203 is therefore 869.45 MHz (return channel 3"). The base station 101 consequently transmits the signal at a base station transmit frequency 203 of 869.45 MHz and the terminal device 102 opens its receive window similarly at the base station transmit frequency 203 of 869.45 MHz.

REFERENCE NUMBER LIST

1 Channel 1
1' Return channel to channel 1
2 Channel 2
2' Return channel to channel 2
3 Channel 3
3',3" Return channel to channel 3
101 Base station
102 Terminal device
103 Apparatus of the base station for reception
104 Apparatus of the base station for determination
105 Apparatus of the base station for transmission
106 Apparatus of the terminal device for reception
107 Apparatus of the terminal device for transmission
201 Basic transmit frequency
202 Terminal device transmit frequency
202a Further terminal device transmit frequency
202b Terminal device transmit frequency without compensation of $\Delta f_{chip, TX}$
203 Base station transmit frequency
203a Base station transmit frequency, terminal device receive window with compensation of $\Delta f_{chip}$
203b Base station transmit frequency, terminal device receive window without compensation of $\Delta f_{chip}$
204 Frequency range
205 Band limit
206 Bandwidth
207 Uplink
208 Downlink
209 Uplink band
210 Downlink band

The invention claimed is:

1. A method for bidirectional frequency-precise data return transmission in a system or narrowband system between a base station and at least one terminal device, the method comprising the following steps:
   providing each of the at least one terminal device and the base station with their own frequency reference unit;
   transmitting the data between the base station and the at least one terminal device over different frequencies;
   defining a basic transmit frequency for transmitting data from the at least one terminal device to the base station;
   using the at least one terminal device to define a terminal device transmit frequency on a terminal device side for transmitting data from the at least one terminal device to the base station, and providing a frequency offset $\Delta f_{offset}$ between the basic transmit frequency and the terminal device transmit frequency;
   using the at least one terminal device to open a receive window to receive data originating from the base station, and taking the frequency offset $\Delta f_{offset}$ into account for opening the receive window;
   using the base station to determine the terminal device transmit frequency;
   using the base station to transmit data back to the at least one terminal device with frequency precision based on the determined terminal device transmit frequency; and
   wherein the terminal device actively sets the frequency offset $\Delta f_{offset}$ in order to define the terminal device transmit frequency.

2. A method for bidirectional frequency-precise data return transmission in a system or narrowband system between a base station and at least one terminal device, the method comprising the following steps:
   providing each of the at least one terminal device and the base station with their own frequency reference unit;
   transmitting the data between the base station and the at least one terminal device over different frequencies;
   using the at least one terminal device to open a receive window to receive data originating from the base station, and providing the window with a frequency offset $\Delta f_{up/down}$ in relation to the terminal device transmit frequency;
   using the at least one terminal device to take $\Delta f_{up/down}$ into account for opening the receive window;
   using the base station to determine the terminal device transmit frequency of the data transmitted by the at least one terminal device;
   using the base station to transmit data back to the at least one terminal device with frequency precision based on the determined terminal device transmit frequency of the at least one terminal device and incorporating $\Delta f_{up/down}$; and
   wherein the frequency offset $\Delta f_{up/down}$ is a fixed value defined in advance.

3. The method according to claim 2, which further comprises:
   using the at least one terminal device to define a further terminal device transmit frequency on the terminal device side to transmit data from the at least one terminal device to the base station, and providing a further frequency offset $\Delta f_{\text{offset}}$ between the basic transmit frequency and the further terminal device transmit frequency;

using the at least one terminal device to take $\Delta f_{\text{offset}}$ into account for opening the receive window of the further terminal device transmit frequency; and using the base station to determine the terminal device transmit frequency of the data transmitted by the at least one terminal device at the further terminal device transmit frequency.

4. A method for bidirectional data transmission in a system or narrowband system between a base station and at least one terminal device, the method comprising the following steps:

providing each of the at least one terminal device and the base station with their own frequency reference unit;

providing each of the at least one terminal device and the base station with at least one radio chip;

connecting the frequency reference units to the radio chips;

transmitting the data between the base station and the at least one terminal device over different frequencies;

using the at least one terminal device to open a receive window to receive data originating from the base station, and taking a frequency offset $\Delta f_{\text{chip}}$ into account for opening the receive window;

the frequency offset $\Delta f_{\text{chip}}$ being dependent on the radio chips in the at least one terminal device; and wherein the frequency offset $\Delta f_{\text{chip}}$ is at least one of:
 determined by measuring frequency-influencing effects of the radio chips; or
 emanating from the architecture of the radio chips.

5. The method according to claim 4, which further comprises fixing and defining the basic transmit frequency in advance.

6. The method according to claim 4, which further comprises providing the frequency offset $\Delta f_{\text{up/down}}$ as a fixed value defined in advance.

7. The method according to claim 4, which further comprises making the frequency offset $\Delta f_{\text{up/down}}$ known to the base station and to the at least one terminal device.

8. The method according to claim 4, which further comprises using the at least one terminal device to define the terminal device transmit frequency for avoiding at least one of interference-affected frequencies or interference-affected frequency ranges.

9. The method according to claim 4, which further comprises using the at least one terminal device to measure at least one of its own transmit power or an external power and to define the terminal device transmit frequency based on the measuring step.

10. A method for bidirectional data transmission in a system or narrowband system between a base station and at least one terminal device, the method comprising the following steps:

providing each of the at least one terminal device and the base station with their own frequency reference unit;

transmitting the data between the base station and the at least one terminal device over different frequencies;

carrying out the data transmission from the at least one terminal device to the base station at frequencies of an uplink band;

carrying out the data transmission from the base station to a terminal device at frequencies of a downlink band;

using the base station to transmit data to the at least one terminal device based on the determined terminal device transmit frequency and taking a width of the downlink band into account;

using the at least one terminal device to take the width of the downlink band into account for opening the receive window; and at least one of:
 using the base station to transmit data to the at least one terminal device incorporating the frequency offset $\Delta f_{\text{wrap}}$; or
 using the at least one terminal device to take into account the frequency offset $\Delta f_{\text{wrap}}$ for opening the receive window; or
 choosing the frequency offset $\Delta f_{\text{wrap}}$ for locating the resulting transmit frequency of the base station within the downlink band.

11. The method according to claim 10, which further comprises making the uplink band wider than the downlink band.

12. The method according to claim 10, which further comprises making the position of the uplink band and the position of the downlink band known to the base station and to the at least one terminal device.

13. The method according to claim 10, which further comprises providing channels of the bidirectional data transmission in the system or narrowband system with a channel bandwidth range selected from the group consisting of:
 from 1 kHz to 25 kHz, or
 from 2 kHz to 6 kHz, or
 from 3 kHz to 5 kHz.

14. The method according to claim 10, which further comprises providing channels of the bidirectional data transmission in the system or narrowband system with a symbol rate range selected from the group consisting of:
 from 0.5 kbaud to 20 kbaud, or
 from 0.5 kbaud to 6 kbaud.

15. The method according to claim 13, which further comprises selecting a frequency tolerance $\Delta f_T$ of the at least one terminal device to be greater than a bandwidth of the channels.

16. The method according to claim 15, which further comprises selecting the frequency tolerance $\Delta f_T$ of the at least one terminal device to lie within a range selected from the group consisting of:
 from 1 ppm to 100 ppm, or
 from 3 ppm to 50 ppm, or
 from 5 ppm to 30 ppm.

17. The method according to claim 10, which further comprises using the base station to transmit the data to the respective terminal device incorporating a maximum frequency tolerance $\Delta f_{T,\text{max}}$ of the at least one terminal device.

18. The method according to claim 10, which further comprises using the at least one terminal device to take into account a maximum frequency tolerance $\Delta f_{T,\text{max}}$ for opening the receive window.

* * * * *